(12) United States Patent
Lo

(10) Patent No.: US 6,199,460 B1
(45) Date of Patent: Mar. 13, 2001

(54) TOOL HANDLE

(76) Inventor: Chi Yu Lo, P.O. Box 63-99, Taichung, 406 (TW)

( * ) Notice: Subject to any disclaimer, the term of this patent is extended or adjusted under 35 U.S.C. 154(b) by 0 days.

(21) Appl. No.: 09/285,091

(22) Filed: Apr. 2, 1999

(51) Int. Cl.[7] ............................. B25G 1/00; B25B 23/16
(52) U.S. Cl. ............................. 81/489; 81/177.1; 81/900
(58) Field of Search .................... 81/489, 900, 177.1; 16/116 R, DIG. 12; 76/114, 119

(56) References Cited

U.S. PATENT DOCUMENTS

| | | | |
|---|---|---|---|
| 4,825,732 | * | 5/1989 | Arnold .............................. 81/177.1 X |
| 5,740,586 | * | 4/1998 | Gomas .............................. 81/177.1 X |
| 5,956,799 | * | 9/1999 | Panaccione et al. ............. 81/177.1 X |
| 5,964,009 | * | 10/1999 | Hoepfl et al. .................... 81/177.1 X |

FOREIGN PATENT DOCUMENTS

2274615 * 8/1994 (GB) ...................................... 81/489

* cited by examiner

*Primary Examiner*—D. S. Meislin

(57) ABSTRACT

A tool handle includes one or more peripheral projections extended outward from the outer peripheral portion and each having a cavity for receiving a filled material. A cover sleeve is engaged on the outer peripheral portion of the handle. The filled material and the cover sleeve are preferably selected from the soft materials, such as rubber, and may be different from each other. The handle includes one or more passages communicating with the cavities for receiving the filled material and for solidly retaining the material in place.

1 Claim, 6 Drawing Sheets

TOOL HANDLE

BACKGROUND OF THE INVENTION

1. Field of the Invention

The present invention relates to a tool, and more particularly to a tool handle.

2. Description of the Prior Art

Typical tool handles comprise a solid structure that may not be formed with various patterns.

The present invention has arisen to mitigate and/or obviate the afore-described disadvantages of the conventional tool handles.

SUMMARY OF THE INVENTION

The primary objective of the present invention is to provide a tool handle which may be formed with various required patterns.

In accordance with one aspect of the invention, there is provided a tool handle comprising a handle body including an outer peripheral portion, and including at least one peripheral projection extended outward from the outer peripheral portion thereof and having a cavity formed therein, a cover sleeve engaged on the outer peripheral portion of the handle body, and a material engaged in the cavity of the peripheral projection.

The handle body includes at least one passage and/or a bore formed therein and communicating with the cavity of the peripheral projection for receiving the material.

The passage of the handle body includes a size greater than that of the cavity of the peripheral projection for solidly receiving the material in the passage and the cavity of the handle body.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
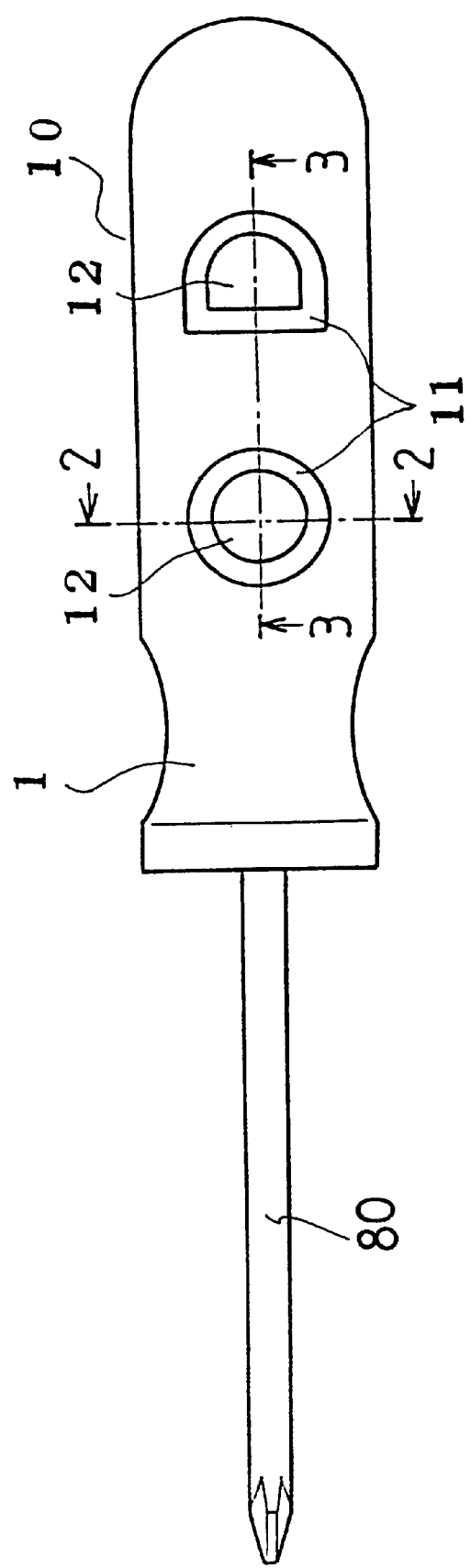
FIG. 1 is a plan view of a tool in accordance with the present invention, in which the cover material has not been applied onto the tool handle.
Figure 2:
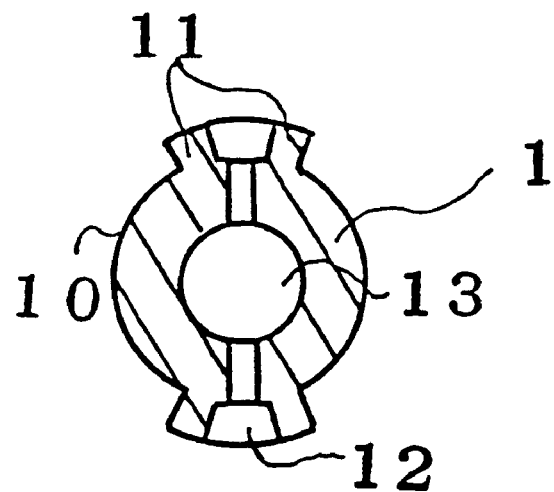
FIGS. 2 and 3 are cross sectional views taken along lines 2—2 and 3—3 of FIG. 1 respectively, in which the cover material has not been applied onto the tool handle.
Figure 3:
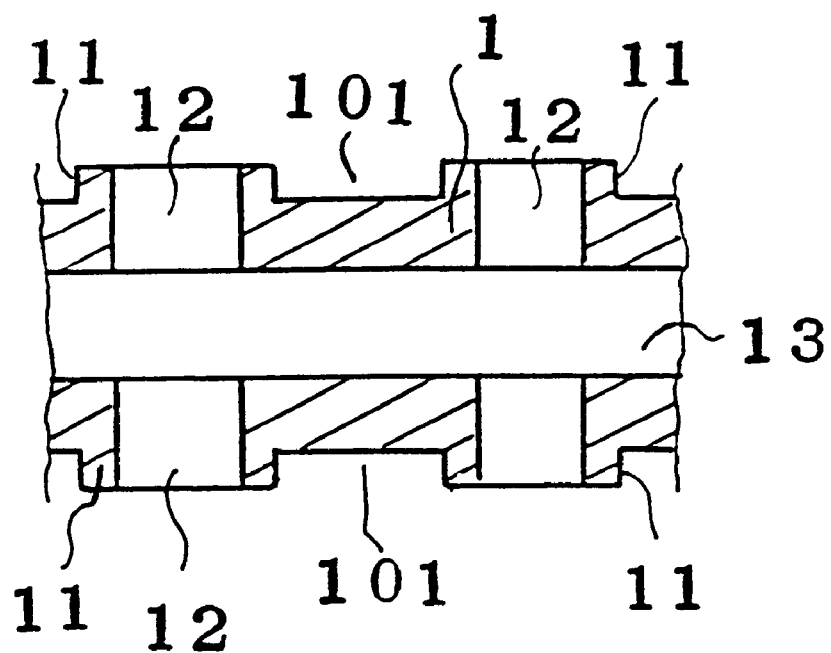
Figure 5:
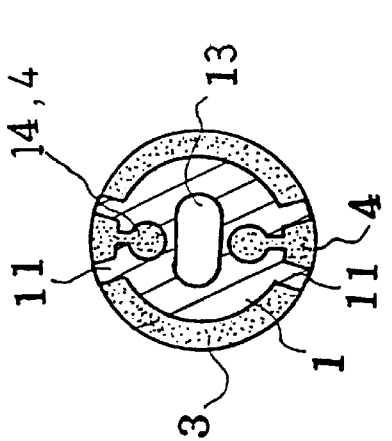
FIGS. 4 and 5 are cross sectional views similar to FIGS. 3 and 2 respectively, in which the cover material has been applied onto the tool handle.
Figure 4:
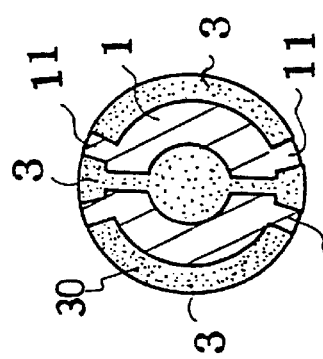

Referring to the drawings, and initially to FIGS. 1–5, a tool in accordance with the present invention comprises a tool member 80 attached or secured to a handle body 1 so as to be driven by the handle body 1. The handle body 1 includes one or more peripheral projections 11 extended outward from the outer peripheral portion 101 of the handle body 1 for forming one or more cavities 12 therein which are communicated with the bore 13 of the handle body 1. A cover material 3 is then filled into or injected into the bore 13 of the handle body 1 and into the cavities 12 and filled onto the outer peripheral portion 101 of the handle body 1, by such as a molding process, for forming a cover sleeve 30 on the outer peripheral portion 101 of the handle body 1 (FIGS. 4, 5). The peripheral projections 11 may be formed with various shapes.

Figure 7:
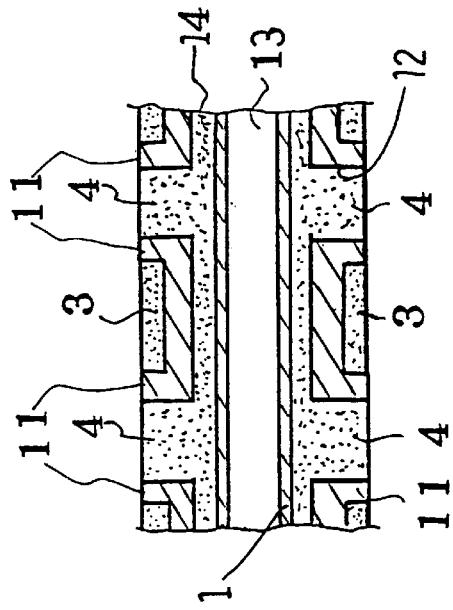
FIGS. 6 and 7 are cross sectional views similar to FIGS. 4 and 5 respectively, illustrating the other application of the tool handle.
Figure 6:
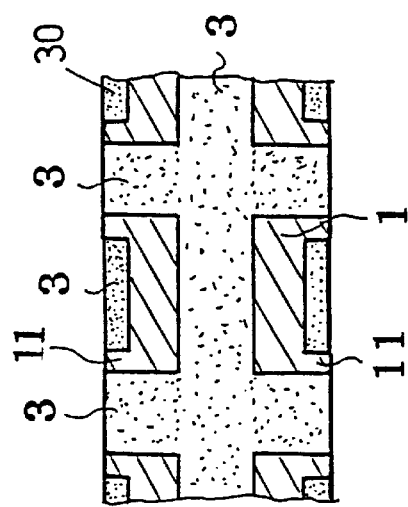
Figure 8:
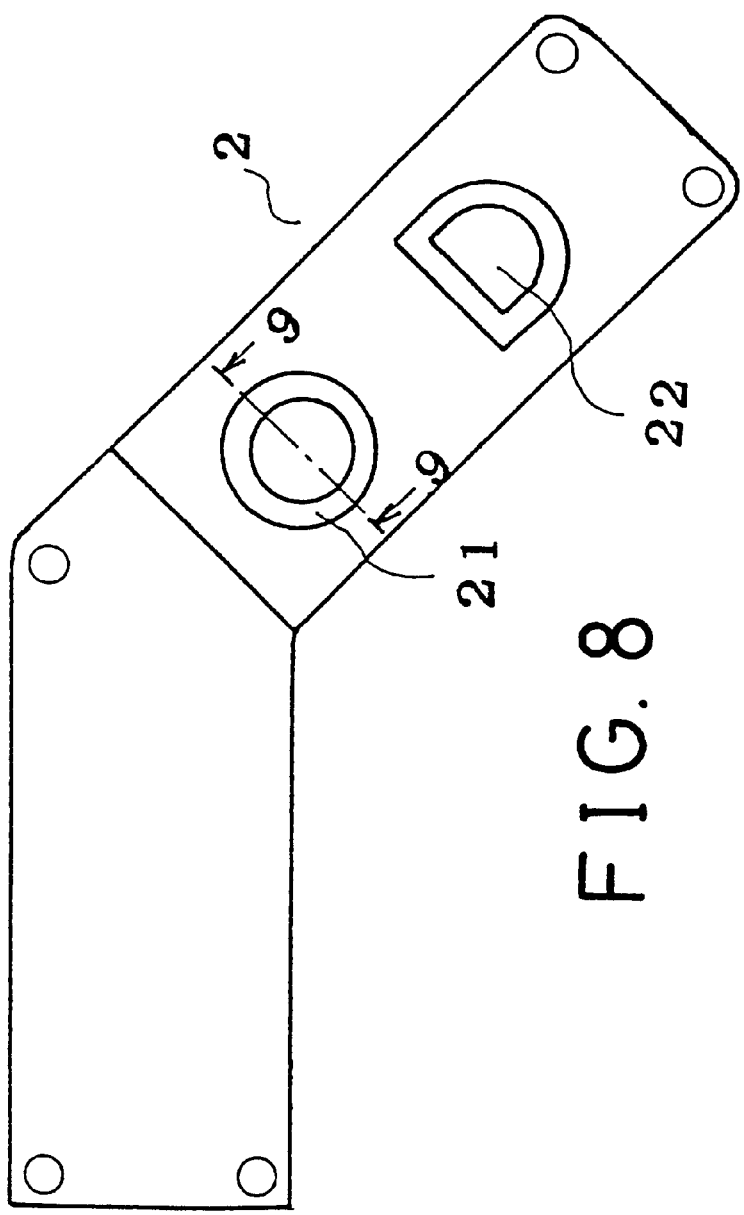
FIG. 8 is a plan view showing a tool handle for a power tool, in which the cover material has not been applied onto the tool handle.
Figure 9:
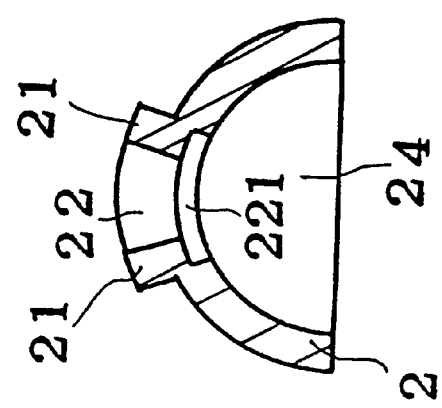
FIG. 9 is a cross sectional view taken along lines 9—9 of FIG. 8

Referring next to FIGS. 6 and 7, the handle body 1 may include one or more passages 14 communicating with the cavities 12 of the handle body 1 for receiving the materials 4. The cover material 3 may be filled only onto the outer peripheral portion 101 of the handle body 1 for forming the cover sleeve 30 on the outer peripheral portion 101 of the handle body 1. The materials 3, 4 are preferably made of soft materials, such as rubber or the like, and may be different from each other or may be identical with each other. The bore 13 of the handle body 1 is not communicated with the passages 14 and/or the cavities 12 and will not be filled with the materials 3, 4.

Figure 11:
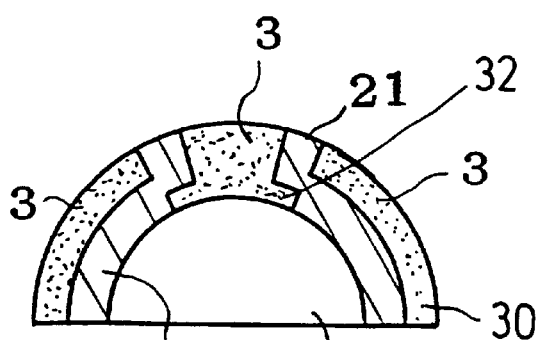
FIGS. 10 and 11 are cross sectional views, similar to FIG. 9, illustrating the formation of the cover material on the tool handle.
Figure 10:
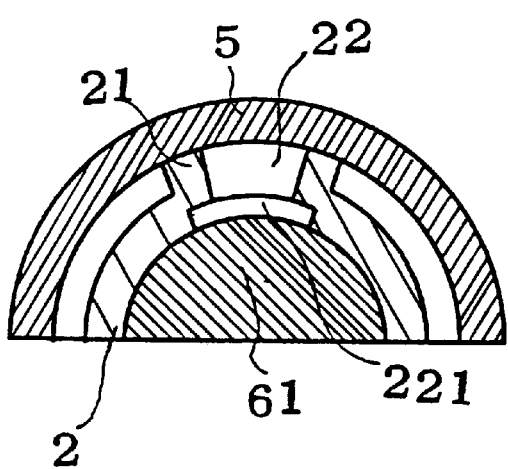
Figure 12:
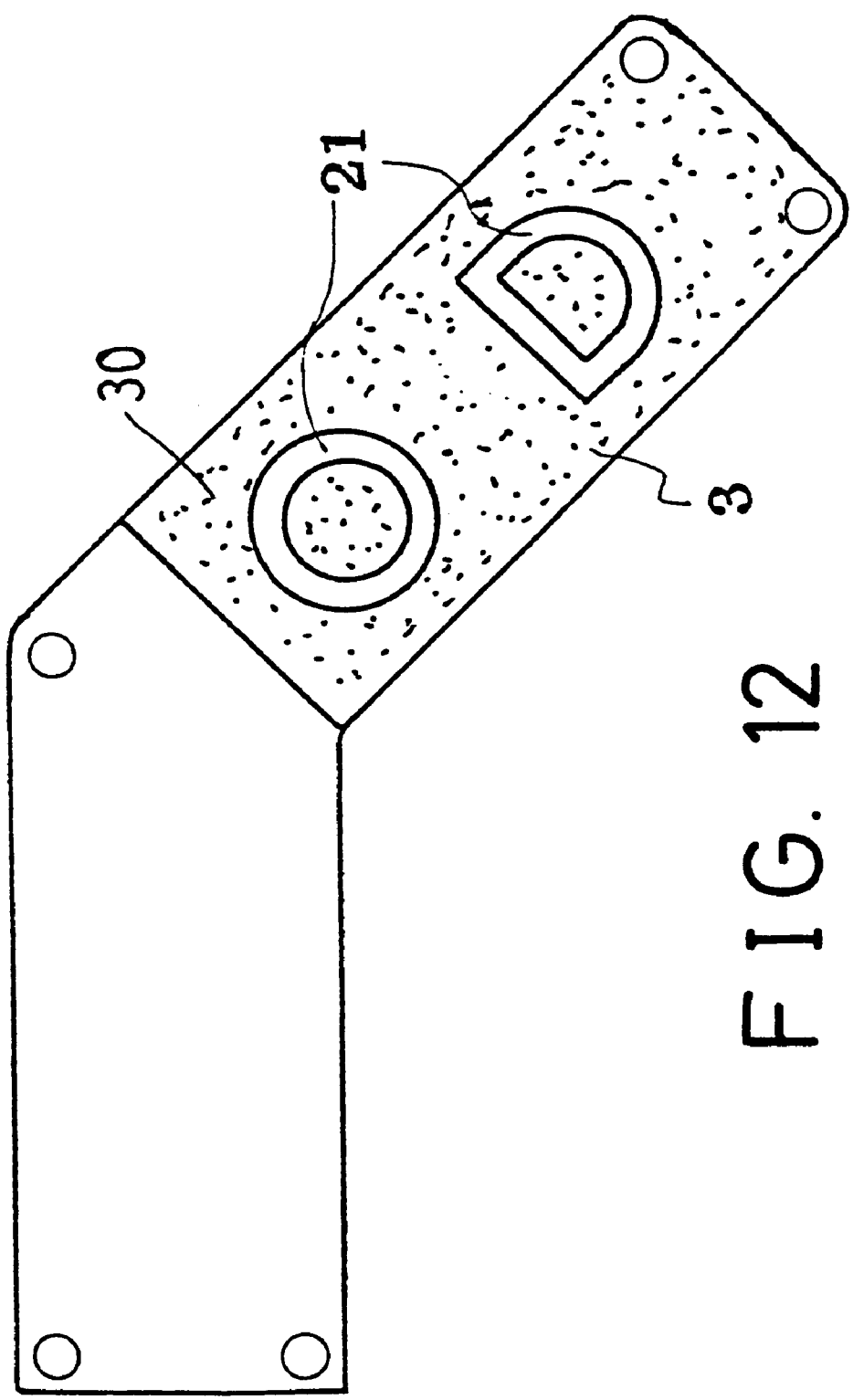
FIG. 12 is a plan view of the tool handle for the power tool, in which the cover material has been applied onto the tool handle.

Referring next to FIGS. 8–12, the tool handle 2 may also be a handle for the power tool and includes a bore 24 and one or more peripheral projections 21 extended outward from the outer peripheral portion of the handle body 1 for forming one or more cavities 22 and passages 221 therein which are communicated with the bore 24 of the handle body 2. A core 61 may be engaged into the bore 24 of the handle body 2 and a mold piece 5 is engaged on the handle body 1 (FIG. 10) such that the cover material 3 may then be filled into or injected into the cavities 22 and the passages 221 of the handle body 2 and filled onto the outer peripheral portion of the handle body 2, by the molding process, for forming the cover sleeve 30 on the outer peripheral portion of the handle body 2 (FIGS. 11, 12). The passage 221 has a size greater than that of the cavities 22 such that the material 3 has a portion 32 engaged in the passage 221 and such that the material 3 filled in the cavities 22 and the passages 221 may be stably retained in place and will not be disengaged from the handle body 1. The material 3 may be filled into the cavities 22 via the passages 221.

Figure 14:
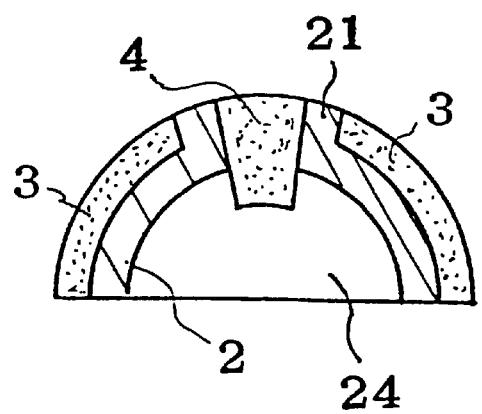
FIGS. 13 and 14 are cross sectional views, similar to FIGS. 10 and 11, illustrating the formation of the cover material on the tool handle.
Figure 13:
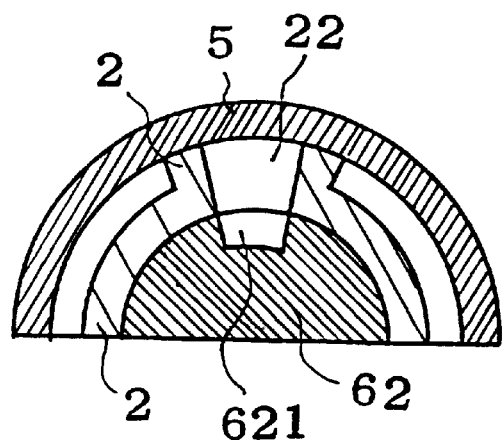

Referring next to FIGS. 13 and 14, the core 62 may include a groove 621 formed therein and communicating with the cavities 22 and/or the passages 221 for allowing the material(s) 3 and/or 4 to be formed and extended inward of the bore 24 of the handle body 2.

Accordingly, the tool handle in accordance with the present invention may be formed with various required patterns.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool handle comprising:

a handle body including an outer peripheral portion, and including at least one peripheral projection extended outward from said outer peripheral portion thereof and having a cavity formed therein, said handle body includes a bore formed therein and communicating with said cavity of said at least one peripheral projection, said handle body including at least one passage formed therein and communicating with said cavity of said at least one peripheral projection, said at least one passage of said handle body including a size greater than that of said cavity of said at least one peripheral projection, a cover sleeve engaged on said outer peripheral portion of said handle body, and a material engaged in said cavity of said at least one peripheral projection and in said at least one passage of said handle body, said at least one passage of said handle body including the size greater than that of said cavity of said at least one peripheral projection, such that said material is solidly received in said at least one passage and said cavity of said handle body.

* * * * *